Dec. 6, 1960 C. J. POLITIS 2,962,758
METHOD AND APPARATUS FOR FORMING
HOLLOW PLASTIC ARTICLES
Filed Feb. 8, 1957 4 Sheets-Sheet 1
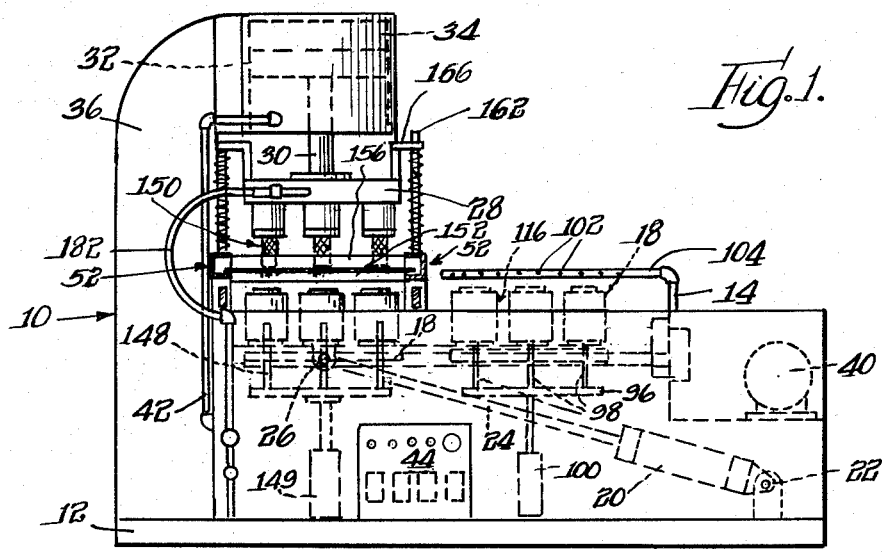
Fig. 1.
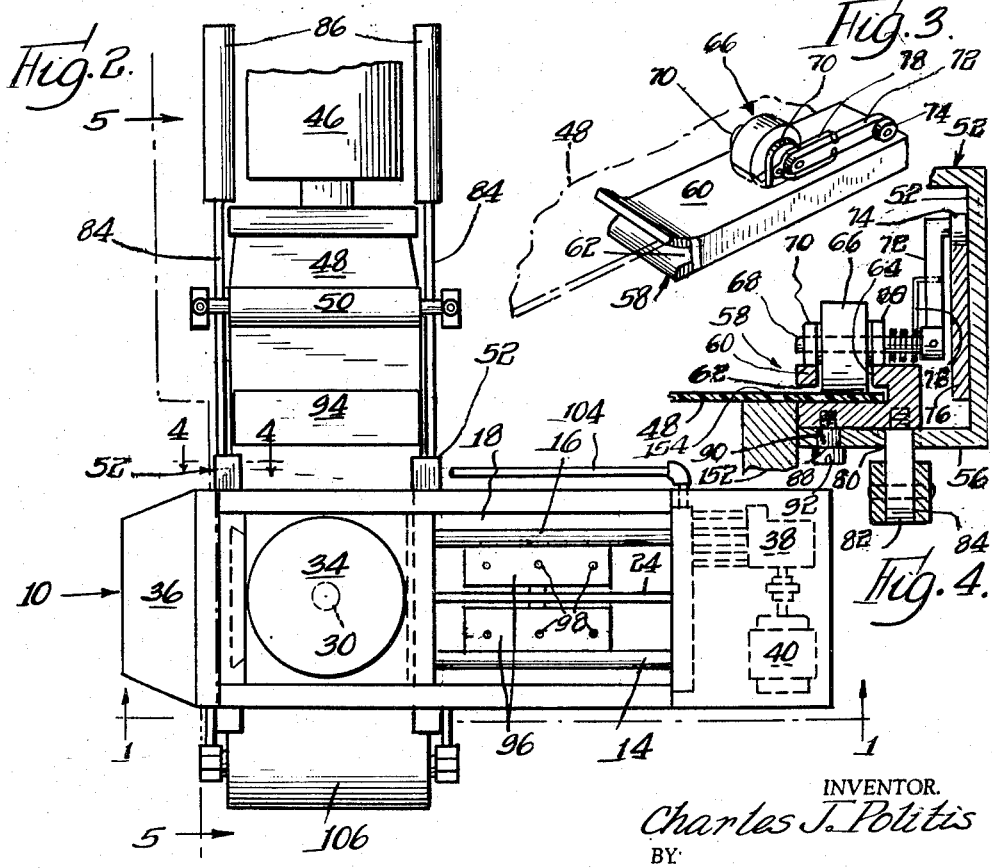
Fig. 2.
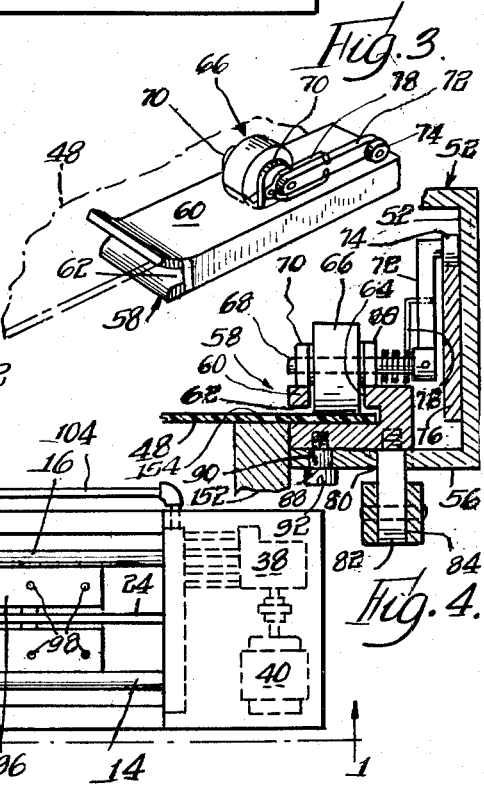
Fig. 3.
Fig. 4.
INVENTOR.
Charles J. Politis
BY
Olson & Trexler
Attys Dec. 6, 1960 C. J. POLITIS 2,962,758
METHOD AND APPARATUS FOR FORMING
HOLLOW PLASTIC ARTICLES
Filed Feb. 8, 1957 4 Sheets-Sheet 2
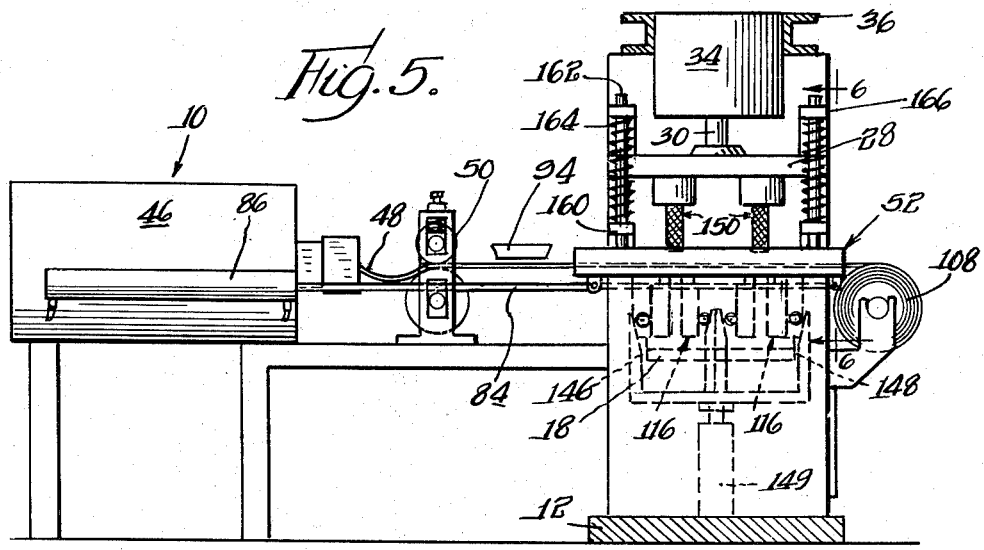
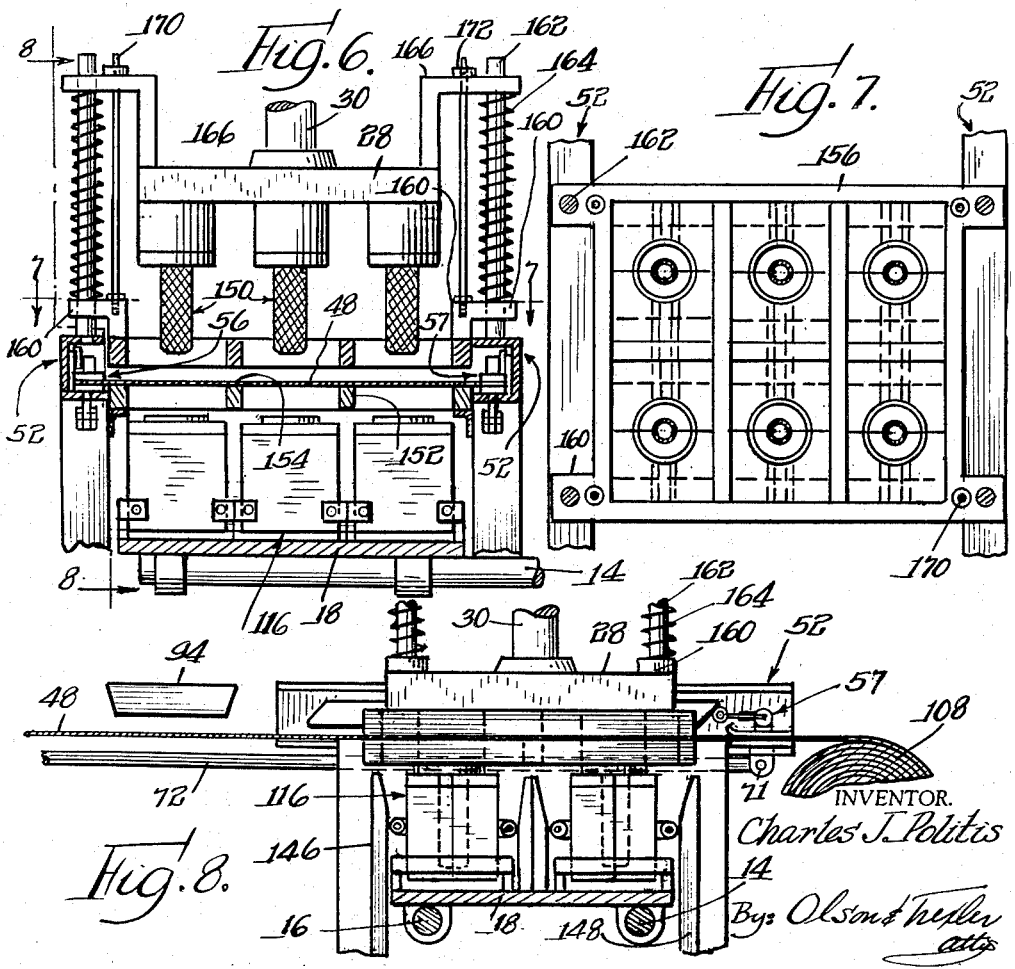
INVENTOR.
Charles J. Politis
By: Olson & Trexler
attys

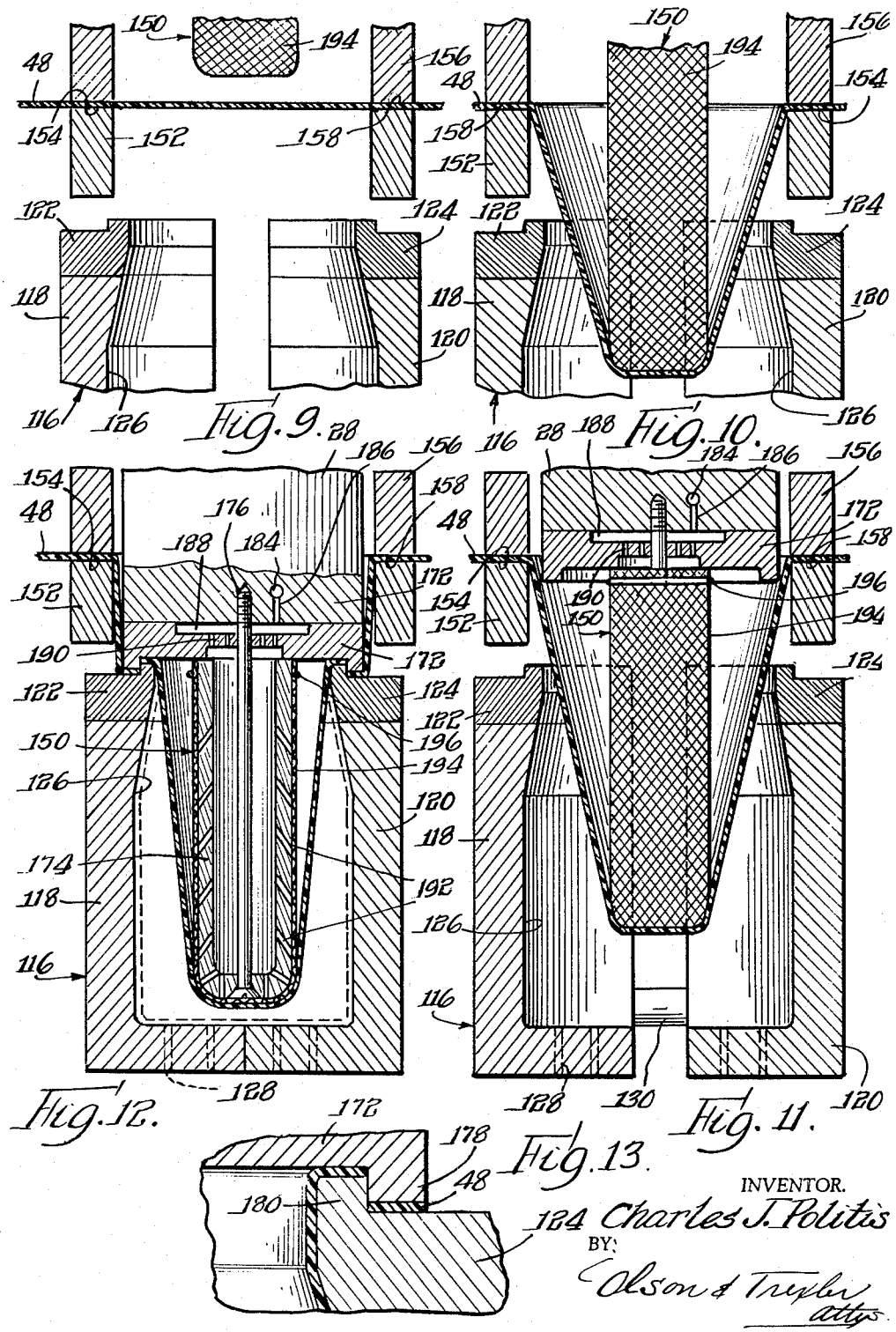

Dec. 6, 1960  C. J. POLITIS  2,962,758
METHOD AND APPARATUS FOR FORMING
HOLLOW PLASTIC ARTICLES
Filed Feb. 8, 1957 4 Sheets-Sheet 4
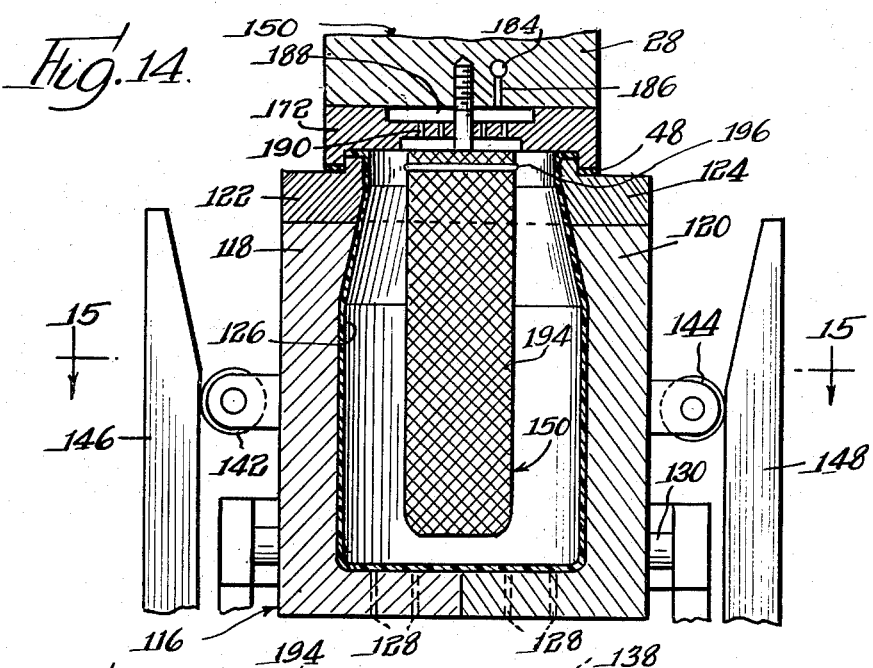
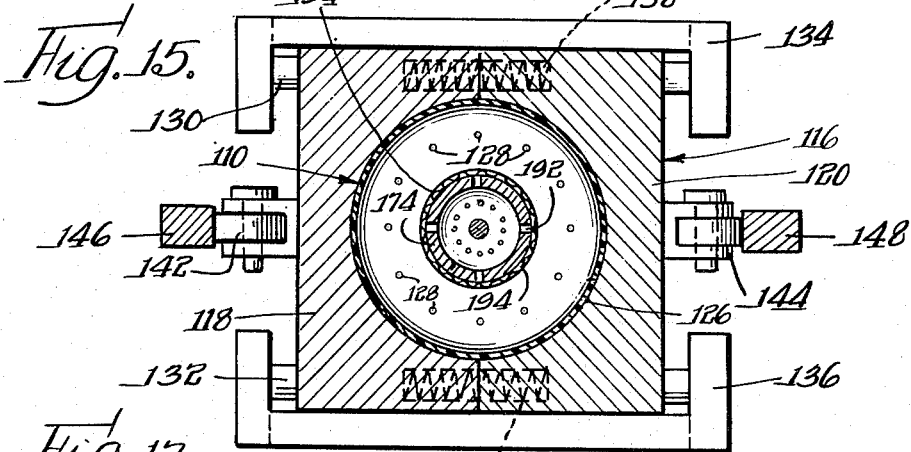
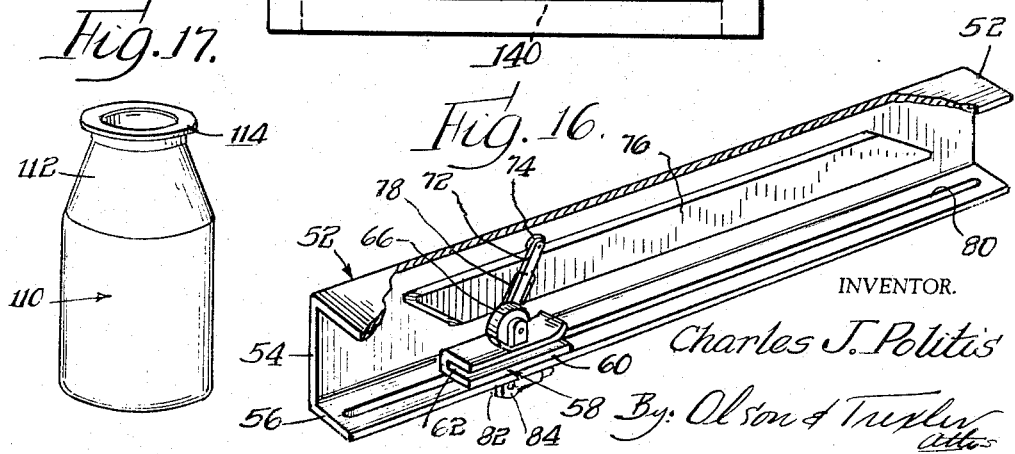
INVENTOR.
Charles J. Politis
By Olson & Trexler
attys

United States Patent Office 2,962,758
Patented Dec. 6, 1960

2,962,758

METHOD AND APPARATUS FOR FORMING HOLLOW PLASTIC ARTICLES

Charles J. Politis, Athens, Greece, assignor, by mesne assignments, to Illinois Tool Works, Chicago, Ill., a corporation of Illinois Filed Feb. 8, 1957, Ser. No. 639,091

5 Claims. (Cl. 18—19)

The present invention relates to a novel method and apparatus for forming containers or similar hollow articles and more particularly to a novel method and apparatus for forming containers or hollow articles from sheets of plastic material.

It has heretofore been proposed that relatively shallow containers or similar articles may be formed from a sheet of plastic material by mechanically shaping plastic material with a plunger and pressing the material against the interior surface of a mold with the plunger. It has also been suggested that such relatively shallow articles may be produced by partially forming the sheet material around a plunger, then pressing an upper marginal portion of the partially formed container against the inner surface of a mold, and then forcing air through a plurality of ports in the plunger to expand the lower portion of the partially formed container into contact with the remainder of the mold. While these prior suggestions may be satisfactory for some purposes, it has been found that they are subject to several disadvantages. For example, various portions of the plastic sheet material may be stretched or drawn different amounts so that the resulting article has an objectionable variable wall thickness and also objectionable irregular flow lines appearing in the wall whereby the article is not readily marketable as a result of inadequate strength or ruggedness and unpleasant appearance. Furthermore, it has been necessary to utilize relatively thick sheet material or to form the walls of such prior containers relatively thick so that the weight of plastic material in each container is unnecessarily high, and since the plastic material is expensive as compared with paper and the like, it has been difficult to obtain plastic containers which can compete pricewise with similar paper containers. In addition, no practical method and apparatus has heretofore been suggested for forming relatively deep containers from sheets of plastic material, or in other words, containers or hollow articles having a depth substantially greater than the diameter thereof, nor have such prior suggestions been capable of producing a satisfactory marketable plastic container from sheet material, which container has a restricted mouth and may, for example, be used as a milk bottle.

An important object of the present invention is to provide a novel method and apparatus for economically forming hollow articles or containers from a sheet of plastic material while at the same time providing articles which are sufficiently rugged and which have a pleasing appearance so that they are readily marketable.

A more specific object of the present invention is to provide a novel method and apparatus for forming containers and the like from sheet material in a manner so as to provide these containers with a controlled wall thickness throughout, with the wall being paper thin, if desired, so as substantially to reduce the weight of plastic material required for each container and thereby the cost of each container.

Another more specific object of the present invention is to provide a novel method and apparatus for forming containers and the like from a sheet of plastic material wherein differential air pressure between opposite sides of the sheet is utilized to force the sheet material against the surface of a mold without causing undesirable variations in the wall thickness of the finished article, and without causing undesirable flow lines to be formed in the sheet material.

Another object of the present invention is to provide a novel method and apparatus of the above described type which enables deep containers or containers having a depth substantially greater than the height and/or a restricted mouth to be formed from sheet material in a manner so that such containers are economical, rugged and of pleasing appearance and therefore marketable.

Still another object of the present invention is to provide a novel method and apparatus of the above described type whereby a plurality of containers or similar hollow articles may be simultaneously formed from a sheet of plastic material so as further to promote economical production thereof.

A still further object of the present invention is to provide a novel method and apparatus of the above described type for forming articles from a continuous sheet of plastic material whereby handling and transferring of the sheet material stock and the articles from and to various work stations is reduced and simplified in order further to promote economical production of the articles.

A more specific object of the present invention is to provide a novel method and apparatus of the type referred to in the preceding paragraph wherein a continuous sheet of plastic material is fed directly from an extruding mechanism or other mechanism for forming the sheet to an article forming mechanism.

Other and further objects and features of the present invention will become apparent from the following description and the accompanying drawings showing, by way of an example, apparatus according to the present invention, and in which:

Fig. 1 is a cross sectional view taken along the line 1—1 of Fig. 2;

Fig. 2 is a plan view of the apparatus shown in Fig. 1;

Fig. 3 is an enlarged fragmentary perspective view showing clamping means operative for advancing a sheet of plastic material to be subjected to a molding operation;

Fig. 4 is an enlarged fragmentary cross sectional view taken along the line 4—4 of Fig. 2 showing the clamping means also illustrated in Fig. 3;

Fig. 5 is a cross sectional view taken along the line 5—5 of Fig. 2;

Fig. 6 is an enlarged fragmentary cross sectional view taken along the line 6—6 of Fig. 5 showing the molds of the apparatus of the preceding figures as positioned immediately before a molding operation;

Fig. 7 is a cross sectional view taken along the line 7—7 of Fig. 6;

Fig. 8 is a fragmentary cross sectional view taken along the line 8—8 of Fig. 6;

Fig. 9 is a fragmentary enlarged vertical central cross sectional view showing a single pair of molds at the beginning of the molding operation;

Fig. 10 is a view similar to Fig. 9 but showing a subsequent stage in the molding operation;

Fig. 11 is a view similar to Fig. 10 but showing a subsequent stage of the molding operation;

Fig. 12 is a view similar to Fig. 11 but showing a subsequent stage of the molding operation;

Fig. 13 is an enlarged fragmentary cross sectional view similar to Fig. 12 showing shearing edges forming part of the mold illustrated in Figs. 9–12;

Fig. 14 is a view similar to Figs. 9–12 but showing the position of the mold parts after completion of the molding operation and also illustrating means for closing and opening the female mold which is split;

Fig. 15 is a cross sectional view taken along the line 15—15 of Fig. 14;

Fig. 16 is an enlarged perspective view, with parts broken away, of the clamping means also shown in Figs. 3 and 4; and Fig. 17 is a perspective view of a milk bottle produced by the apparatus of Figs. 1–16.

Referring now to Figs. 1, 2 and 5, an apparatus according to the present invention is there indicated generally by the reference numeral 10. This apparatus includes a base and supporting structure 12 providing a pair of spaced parallel rails 14 and 16 on which a platen 18 carrying the female molds (described hereinbelow) is slidably disposed for movement between a molding position indicated in Fig. 1 in full lines and a position shown in Fig. 1 in broken lines (and in Fig. 2 in full lines) where the molded articles are ejected from the female molds. Means are provided for reciprocating the platen 18 between the two above indicated positions, including a double-acting hydraulic cylinder 20 pivotally mounted on the base 10, as at 22, and having a piston rod 24 pivotally connected to the platen 18, as at 26.

A second platen 28 carries a plurality of male molds (described hereinbelow) adapted to cooperate with the female molds of the first platen 18 for molding plastic articles. The platen 28 is connected with the lower end of a plunger 30 extending downwardly from a piston 32 slidably mounted in a cylinder 34 supported by an upstanding beam 36 of the base 12.

Hydraulic fluid under pressure for actuating the cylinders 20 and 34 is provided by a pump 38 driven by an electric motor 40. Suitable conduits (not shown) connect the pump 38 with both ends of the cylinder 20. Other conduits, including a conduit indicated at 42, connect the pump 38 with the lower end of the cylinder 34. A control panel 44 includes various timing devices and control valves for controlling the operation of the cylinders 20 and 34 as well as other elements of the apparatus described hereinbelow. Since the timing devices and control valves may be constructed and arranged in known manner, they need not be described in detail.

In accordance with the present invention, the containers or other hollow articles are preferably formed from a continuous sheet of organic thermoplastic material such as polystyrene or modified polystyrene. Preferably, such a sheet of plastic material is fed directly from means for extruding or otherwise forming the sheet to a work station between the two platens 18 and 28. Thus, the apparatus 10 may include an extrusion apparatus 46 of known construction to form a continuous sheet 48 of thermoplastic material at a substantially uniform rate determined by the rate of operation of the apparatus 10. In order to maintain the extruded sheet 48 in tension, the sheet is passed between a pair of spring pressed rollers 50 before gripping means (described hereinbelow) grasp the sheet and move it to the molding station between the two platens 18 and 28.

The gripping means referred to in the preceding paragraph include (see Figs. 3, 4 and 16) a pair of U-shaped rails generally indicated at 52 each including an outer vertical bight 54 and a lower horizontal leg 56. A pair of clamps of identical construction generally indicated at 58 are slidable on the legs 56. Specifically, each clamp 58 includes a body member 60 having a horizontal slot 62 opening on the inside of the body member and serving to receive one lateral margin of the sheet 48. The top of the body member 60 is formed with an aperture 64 having communication with the slot 62 above the margin of the sheet 48. A wheel 66 projects into the aperture 64, having an eccentrically arranged axle 68 journalled above the aperture 64 in a pair of standards 70 projecting upwardly from the body member 60 on both sides of the aperture 64. In one position of rotation, the wheel 66 will clamp the margin of the sheet 48 against the bottom surface of the slot 62. In another position of rotation, the wheel 66 will permit movement of the sheet 48 in the slot 62. For rotating the wheel 66 between its clamping and released position, a crank arm 72 is rigidly connected to the axle 68 and provided at its free end with a roller 74. A cam 76 having the form of a parallelogram is affixed to the inside of the bight 54. A wire spring 78 including a coil disposed around the axle 68 and arms engaging the crank 72 biases the roller 74 to a position between the upper and lower surfaces of the cam 76, thereby causing the roller to follow the perimeter of the cam 76 as the clamp is reciprocated over the leg 56. The top surface of the cam 76 holds the wheel 66 in clamping position, while the bottom surface holds the wheel in released position. For reciprocating the clamps 58 over the legs 56, the latter are formed with a longitudinal slot 80 to receive a stud 82 depending therethrough from the clamp body 60, and each stud depending from the clamps 58 is connected to one of a pair of piston rods 84 actuated by a pair of double-acting hydraulic cylinders 86 suitably connected to the pump 38. The leg 56 is also formed with a second longitudinal slot 88 slidingly receiving the flat stem of a bolt 90 having a head 92 which slides over the bottom surface of the leg 56 and serves to hold the clamp body 60 on the leg 56.

In the operation of the apparatus described hereinabove, the forward end of the extruded sheet 48 is initially passed between the rollers 50 and into the slots 62 of the clamps 58 while the latter are at their left position (shown in Fig. 5 in full lines) and in released condition. Upon subsequent operation of the apparatus, the clamps 58 grip the forward end of the sheet 48 and, when moved by the cylinders 86 to the right position (shown in Fig. 5 in broken lines), pull the sheet 48 to the right so that the distal portion thereof is held between the upper platen 28 and the lower platen 18 for the performance of a molding operation thereon, the sheet 48 being tense between the rollers 50 and the clamps 58. When the molding operation has been completed, the clamps 58 are moved into released position, retracted to the left position shown in Fig. 5 and again clamp the margins of the sheet 48, the same cycle of steps then being repeated.

In order for the sheet 48 to be molded (as described hereinbelow), the sheet must be maintained at a suitable elevated temperature. Therefore, suitable heating means, such as an electric radiant heater 94, is mounted over the sheet 48 (by means not shown) between the rollers 50 and the platens 18 and 28. Since that portion of the sheet 48 beneath the heater is held stationary while a molding operation is being performed on the thereto distal portion of the sheet 48, the entire sheet area beneath the heater 94 will be heated uniformly to the desired temperature.

After the molding operation has been performed on the sheet 48 (as described hereinbelow), the hydraulic cylinder 20 is actuated to shift the lower platen 18 from the left position shown in full lines in Fig. 1 to the right position shown in broken lines. In this last position, the platen 18 is in alignment with a lower platen 96 carrying a plurality of upwardly projecting ejector pins 98. The platen 96 is adapted to be reciprocated vertically by a hydraulic cylinder 100 suitably connected to the pump 38. When the platen 96 is raised, the ejection pins 98 pass between the then separated halves of the female molds carried by the platen 18 and raise the molded articles from the molds. At the same time, a blast of air is directed from a plurality of orifices 102 in a pipe 104 connected with a source of air under pressure (not shown), so as to blow the ejected articles across the platen 18 and onto a chute or conveyor (not shown), at the side of the apparatus 10.

In the molding operation performed between the platens 18 and 28, the area of the sheet 48 operated upon is punched out to leave a network of scrap sheet material 106 which, upon subsequent operation of the clamps 58, is displaced to the right, as shown in Fig. 5, and may be wound upon a reel 108.

It will be noted that the direction of travel of the sheet 48 and the network of scrap sheet material 106 is at right angles to the direction of reciprocation of the lower platen 18. Further, the reciprocation of the clamps 58 and of the lower platen 18 are so synchronized that the clamps 58 are held stationary in gripping condition in the right position shown in Fig. 5 while the platen 18 is reciprocated from its right position in Fig. 1 to the left position shown in the same figure, held in this position while the molding operation is being performed and then retracted to the right position shown in Fig. 1. Further, while the platen 18 is in the right position shown in Fig. 1 and after the molding operation has been performed, the clamps 58 are released, retracted to the left position shown in Fig. 5, placed in gripping condition, and returned to the right position shown in Fig. 5.

The following paragraphs will describe the construction and operation of the molds associated with the platens 18 and 28 in the molding of articles such as the milk bottle generally indicated in Fig. 17 by the reference numeral 110 having a restricted neck portion 112 terminating in a horizontal bead or lip 114.

The platen 18 has depending therefrom a plurality of female molds each indicated generally by the reference numeral 116. As shown in Figs. 14 and 15, each mold is split along a central vertical plane and includes complementary main body portions 118 and 120 formed from a relatively low cost metal and complementary die ring portions 122 and 124 formed from hardened steel. These main body and die ring portions combine to define a mold cavity 126 which has the shape of the article to be formed. In order to permit air to escape uniformly from all portions of the mold cavity during formation of the article, a plurality of vent passageways 128 are formed in the bottoms of the main body portions 118 and 120. These passageways are circularly arranged, preferably adjacent the outer wall of the mold. The two halves 118, 122 and 120, 124 of each mold 116 are slidably supported on rods 130 and 132 carried by brackets 134 and 136 mounted on the platen 18. The mold portions 118 and 120 are formed with pairs of opposing bores in which springs 138 and 140 are disposed for yieldably urging the mold halves 118, 122 and 120, 124 apart. Rollers 142 and 144 are mounted on the mold portions 118 and 120 for engagement with cam fingers 146 and 148 projecting upwardly from a piston operated by a cylinder 149 suitably connected to the pump 38. When the cam fingers 146 and 148 are raised, they engage the rollers 142 and 144 and force the mold halves 118, 122 and 120, 124 together as the molding operation (described hereinbelow) is performed. When the piston of the cylinder 149 descends, the cam fingers are disengaged from the rollers 142 and 144 so that the mold halves spread apart to permit the ejection of the molded article, for instance, a bottle.

The upper platen 28 has depending therefrom a plurality of plunger and die assemblies each indicated generally by the reference numeral 150. These plunger and die assemblies cooperate with the female molds 116. Further, means are provided for clamping the plastic sheet 48 around each pair of opposed male molds 150 and female molds 116 including a fixed lower plate 152 attached to the legs 56 of the rails 52 and apertured to define a network of clamping surfaces 154 extending above each female mold 116 and spaced radially therefrom. Note that the surfaces 154 are flush with the lower side walls of the clamp slots 62. A similarly apertured upper plate 156 having clamping surfaces 158 is reciprocable vertically. Specifically, the plate 156 carries at each of its corners a standard 160 having its end deflected outwardly and apertured to receive therethrough a vertical guide post 162 extending from the top of one of the rails 52. Coil springs 164 extend around the posts 162 above the standards 160 of the plate 156 to urge the latter away from the lower plate 152. Arms 166 apertured to receive therethrough the posts 162 extend from the upper platen 28 to bring the plates 152 and 156 into clamping engagement before the male molds 150 engage the plastic sheet 48.

The function of the clamping plates 152 and 156 is to clamp the sheet 48 around and above each female mold 116 before and during the molding operation. Note that the level of clamping is considerably above the mouths of the female molds 116 and that the area of the sheet 48 encompassed by each pair of clamping areas 154 and 158 around each pair of female molds 116 and male molds 150 is considerably greater than the area of the mouth of a female mold 116.

For lifting the upper clamping plate 156 away from the lower clamping plate after molding operation has been completed, a rod 170 has its lower end fixed to each standard 160 and projects upwardly through an aperture in each arm 166 extending from the platen 28. A nut 171 at the upper end of each rod 170 is seated on the top surface of each arm 166 so that the latter, on upward movement of the platen 28 will carry the plate 156 with it.

Each plunger and die assembly includes a die block 172 abutting the platen 28 and an elongated hollow plunger 174 extending downwardly from the die block and secured thereto by a bolt 176. The diameter and length of the plunger are less than the corresponding dimensions of the mold cavity 126 so that the plunger 174 does not press any part of the plastic sheet 48 against any part of the mold cavity wall before the initial, partial formation of the bottle or other article or container has been completed. After the initial formation of the bottle to be molded is accomplished by the plunger 174, air under pressure is introduced substantially uniformly into all portions of the partially formed container so as to expand and press the container wall against the wall of the mold cavity 126. In order for the air under pressure to be effective for the purpose indicated, it is necessary to seal the upper end of the partially formed container. The manner of providing this seal according to the present invention is shown in Fig. 13. Each die block 172 has an outer peripheral depending flange 178 cooperating with an inner upwardly projecting peripheral flange 180 on the die ring 122, 124 of the corresponding female mold 116. Specifically, the two flanges 178 and 180 cooperate to shear the plastic sheet 48 along a circular line defining the rim of the lip 114 of the bottle 110. Further, the margin of the sheared lip 114 is sealingly clamped between the top of the flange 180 and the bottom surface of the die block 172 inside the flange 178.

Air under pressure is introduced into the hollow plungers 174 from any suitable source by means of a flexible conduit 182 (see Fig. 1) which discharges into passages 184 formed in the platen 28 and each connected by a short passage 186 to a recess 188 formed in the upper surface of the die block 172. From the recess 188, the air is directed through a plurality of ports 190 into the hollow plunger 174 which is provided with numerous air passageways 192 for directing the air into the partially formed container. Further, the plunger 174 is covered with a closely woven fabric 194 made of cotton, nylon, Dacron or the like which may be held in place by an elastic band 196. The fabric covering 194 serves to diffuse the air flowing through the ports 192 so that the air is distributed evenly throughout the partially formed container.

After the platen 28 has completed its downward stroke, and the initial, partial formation of the container has been effected, as shown in Fig. 12, air under pressure is admitted into the interior of the hollow plunger 174 which flows through the air passageways 192 to be distributed evenly throughout the interior of the partially formed container by the fabric layer 194. This air under pressure expands the partially formed, still plastic container into full contact with the interior mold surface 126 of the female mold 116, as shown in Figs. 14 and 15. The molding operation is then completed, and the platen 28 is moved upwardly, as is also the clamping plate 156, the fingers 146 and 148 then being retracted and the platen 18 thereafter being moved into position for operation of the ejector fingers 98.

During the initial formation of the container by the plunger 150, the upper platen 28 is lowered to cause the sheet 48 to be clamped between the areas 154 and 158, whereby an area of the sheet 48 is held in tense condition, above the mouth of the female mold 116, as shown in Fig. 9. The plunger 150 has not yet contacted the clamped area of the sheet 48. As the platen 28 descends (see Fig. 9), the plunger 174 contacts the sheet 48 (see Fig. 10), stretches the clamped area of the sheet 48 without bringing the sheet 48 into contact with the female mold 116, then stretches the clamped area of the sheet 48 further (see Fig. 11), and finally, while stretching the sheet 48 still further, brings the flanges 178 and 180 into shearing cooperation and clamps the sheared edge of the sheet 48 between the flange 180 and the bottom of the dieblock 172 inside the flange 174 (see Figs. 12 and 13). As the platen 28 descends, the cam fingers 146 and 148 bring the mold halves 118, 122 and 120, 124 of the female molds 116 together, and this movement is completed before the platen 28 has finished its descending movement. There is no contact between the sheet 48 and the female mold 116 until in the last stage of the descending movement of the platen 28. In this manner, too early chilling with correspondent loss of plasticity of limited areas of the sheet 48 is avoided. Such chilling would prevent chilled areas from stretching as far as unchilled areas and would leave the chilled areas thicker than the unchilled areas.

It will be noted that the sheet 48 is stretched from a line defined by the inner edges of the clamping areas 154 and 158 of the clamping plates 152 and 156. Thus, a greater area of plastic sheet material contributes toward the formation of the molded article than if the sheet 48 had been clamped initially between the flange 176 and the bottom of the die block 168 or, in general, if only a sheet area originally coextensive with the mouth of the female mold cavity 116 had been subjected to molding.

Thin walled containers or bottles cannot be satisfactorily formed without the use of the fabric covering 194, since otherwise the air from the passageways 192 will not be uniformly diffused but will form jets causing localized objectionable irregularities or flow lines in the walls of the finished container. But in the presence of this fabric covering 194, and with the plastic sheet 48 inside the mold cavity not chilled by contact with any part of the mold cavity 126 except around the mouth of the mold cavity, thin-walled containers of uniform wall thickness and free from surface irregularities, flow lines, bumps or other objectionable features can be produced. A wall thickness of 0.050 inch can easily be reached.

The method of forming plastic containers in accordance with the present invention and with the apparatus described above is summarized as follows: A continuous sheet of thermoplastic material is continuously supplied from an extruding mechanism or other suitable means and is intermittently advanced past a heating station at which it is heated and softened to any desired extent, to a work station between one or more molds and one or more complementary plungers and die assemblies. The plastic sheet is clampingly supported above and out of contact with the molds, so as to prevent premature localized cooling of the sheet. Then the molds and plungers are relatively advanced toward each other so that the plungers draw the plastic material into the molds and partially form the containers. Then the upper ends of the partially formed containers are sealed by means also operative to sever the containers from the sheet and air under pressure is directed to the plungers and is diffused substantially uniformly throughout the interiors of the partially formed containers so that all portions of the partially formed containers are uniformly acted upon by the air under pressure and are pressed against the walls of the mold cavity. In certain instance, if desired, the interior surfaces of the containers may be embossed during the initial preforming thereof by the plungers so as to provide strengthening and rigidifying ribs. The air under pressure also effects rapid cooling of the plastic material so that as soon as the plastic material has been forced against the walls of the mold cavities, the air under pressure may be shut off and the plungers may be raised. Finally, the containers are ejected from the molds, and the waste portions of the plastic sheet may be severed from the remainder of the sheet and after appropriate treatment returned to the extrusion machine.

While the preferred embodiments of the present invention have been shown and described hereinabove, it is obvious that many details may be changed without departing from the spirit and scope of the appended claims.

The invention is claimed as follows:

1. A method of forming multiple hollow articles such as containers and the like from a sheet of thermoplastic material in a mold having a plurality of mold cavities; which method comprises supporting the sheet adjacent opposite margins thereof in tense condition considerably above the mold, clamping interior peripheral margins of multiple areas within the supported opposite margins of the sheet independently of and considerably above the mold with the interior edges of the clamped peripheral margins spaced radially outwardly of the periphery of the mouths of corresponding mold cavities to a degree permitting each area within the clamped peripheral margins thereof to be projected a substantial distance into a corresponding mold cavity to partially form the article without contacting the mold or mold cavity surface prior to sealing of partially formed articles, providing elongated plungers of a periphery and length less than the corresponding dimensions of an associated mold cavity and pressing with the plungers only on a relatively small central portion of each area to mechanically draw the areas and provide the plurality of partially formed articles extending substantially into a corresponding mold cavity without contacting the surface thereof, relatively moving the mold cavities and plungers toward one another to further draw the areas into the corresponding mold cavities with sealing of the interior of the partially formed articles around lines substantially coincident with the surface of the mold and remaining spaced from the clamped peripheral margins, and utilizing differential air pressure to expand the drawn and partially formed articles against the interior surfaces of the corresponding mold cavities to complete formation of the articles.

2. Apparatus for forming multiple hollow articles such as containers and the like from a sheet of thermoplastic material; and comprising a mold having a plurality of like cavities, a like plurality of elongated plungers each of a periphery and length less than the corresponding dimensions of an associated mold cavity and mounted in opposition to the mold for cooperation with a corresponding mold cavity for drawing predetermined areas of the sheet into the mold cavities upon relative movement of the mold and mold plungers toward each other, means engaging the sheet adjacent opposite margins thereof for supporting the sheet in tense condition between the plungers and the mold and considerably above the mold, clamping means disposed in independent spaced position above said mold and including a grid support located inwardly of the supported sheet and above the mold and having a plurality of openings therethrough corresponding in number and respectively aligned with the mold cavities with suupport surfaces around each opening spaced considerably above and radially outwardly of the mouths of the mold cavities for supporting corresponding internal areas of the sheet for accurately defining the enclosed predetermined areas to be stretched into the mold cavities, means for relatively shifting the plungers through the openings in said grid support to engage only a relatively small central portion of each area and thereafter into corresponding mold cavities to draw the clamped areas of the sheet as partially formed articles substantially into the corresponding mold cavities without contacting adjacent mold surfaces, said means for relatively shifting the plungers thereafter further drawing the partially formed articles of the clamped areas into the mold cavities with sealing of the interior of the drawn areas, and differential fluid pressure means operating within the mold cavities for expanding the drawn areas of the sheet into engagement with the interior surfaces of the corresponding mold cavities for completing the formation of the hollow articles.

3. Apparatus as set forth in claim 2, wherein the mold cavities are each formed of separate sections, and further including means for moving the sections of each mold toward and away from one another in timed relation to the movement of said plungers with said mold sections moving toward one another after the plungers have moved a substantial distance beyond said grid support and into the mold cavities.

4. Apparatus as set forth in claim 2, wherein each plunger is provided with a plurality of openings for admitting air under pressure into the mechanically drawn hollow article, and further including a woven mesh cover over each plunger insulating the plastic material from the plungers with frictional control of sliding of said plastic material over the entering ends of the plungers and diffusing air from said openings to expand the sheet into contact with the mold cavities.

5. Apparatus as set forth in claim 2, and further including means for intermittently moving said margin engaging means relative to the clamping means substantially in the plane of the sheet for feeding the sheet edgewise step-by-step to bring fresh areas of said sheet into cooperative juxtaposition with said clamping means.

References Cited in the file of this patent
UNITED STATES PATENTS

| | | |
|---|---|---|
| 208,097 | House | Sept. 17, 1878 |
| 2,282,423 | Kopitke | May 12, 1942 |
| 2,444,420 | Borkland | July 6, 1948 |
| 2,458,182 | MacDonald | Jan. 4, 1949 |